United States Patent
Kacevas

(10) Patent No.: US 6,643,770 B1
(45) Date of Patent: Nov. 4, 2003

(54) BRANCH MISPREDICTION RECOVERY USING A SIDE MEMORY

(75) Inventor: Nicolas I. Kacevas, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/398,102

(22) Filed: Sep. 16, 1999

(51) Int. Cl.[7] .............................................. G06F 15/00
(52) U.S. Cl. ........................ 712/235; 712/232; 712/239
(58) Field of Search ................................ 712/235, 239, 712/233, 234, 228

(56) References Cited

U.S. PATENT DOCUMENTS

| | | | | |
|---|---|---|---|---|
| 5,040,107 A | * | 8/1991 | Duxbury et al. | ............ 712/216 |
| 5,117,490 A | * | 5/1992 | Duxbury et al. | ............ 712/218 |
| 5,119,483 A | * | 6/1992 | Madden et al. | ............... 714/15 |
| 5,634,103 A | * | 5/1997 | Dietz et al. | ................. 712/215 |
| 5,659,722 A | * | 8/1997 | Blaner et al. | ............... 712/233 |
| 5,666,507 A | * | 9/1997 | Flora | ........................... 712/218 |
| 5,696,958 A | * | 12/1997 | Mowry et al. | ................ 712/23 |
| 5,860,017 A | * | 1/1999 | Sharangpani et al. | ....... 712/218 |
| 6,049,860 A | * | 4/2000 | Krygowski et al. | ........... 712/25 |
| 6,208,361 B1 | * | 3/2001 | Gossett | ........................ 345/506 |
| 6,260,138 B1 | * | 7/2001 | Harris | ......................... 712/239 |

OTHER PUBLICATIONS

"Integrating a Mispredicted Recovery Cache (MRC) into a Superscalar Pipeline" Bondi, J.O.; Nanda, A.K.; Dutta, S.; Microarchitecture, 1996. MICRO–29.Proceedings of the 29th Annual IEEE/ACM International Symposium on , 1996 pp. 14–23.*

* cited by examiner

Primary Examiner—Tuan Q. Dam
Assistant Examiner—William H. Wood
(74) Attorney, Agent, or Firm—Kenyon & Kenyon

(57) ABSTRACT

A mispredicted path side memory is configured to be coupled to a stage in an instruction pipeline. As instructions advance through the pipeline, a result from the stage is stored into the mispredicted path side memory. The result is restored from the mispredicted path side memory into a pipeline stage when a branch is mispredicted.

23 Claims, 3 Drawing Sheets

BRANCH MISPREDICTION RECOVERY USING A SIDE MEMORY

FIELD

The present invention relates to an instruction pipeline in a processor. More particularly, the present invention relates to a mispredicted path side memory for an instruction pipeline.

BACKGROUND

The rate at which a computer or other processing system can process information is often dependent on the speed at which the system processor(s) execute instructions. Therefore, a increased processing may advantageously be obtained by improving the speed at which processor process instructions. Many processors, such as a microprocessor found in a computer, use an instruction pipeline to speed the processing of instructions. FIG. 1 illustrates a known architecture for such an instruction pipeline. The first stage of the pipeline includes a branch prediction unit 100 and a next Instruction Pointer (IP) logic unit 110 that select an instruction to be executed. An instruction cache 120 is accessed in the second stage of the pipeline, and the instruction moves into the third stage. The instruction moves from a third stage unit 130 to a fourth stage unit 140, and so on, before reaching a branch execution unit 150 in the execution stage. The "intermediate stages" shown in FIG. 1 imply that any number of stages can exist in a pipeline. The stages may, for example, generate instructions for an instruction decoder.

Consider, for example, the following sequence of instructions:

| address X1: | XXX1 |
| | JCC-Y1 |
| | XXX2 |
| | XXX3 |
| | XXX4 |
| | XXX5 |
| address Y1: | YYY1 |
| | YYY2 |
| | YYY3 |

In this case, address X1 stores a first instruction ("XXX1") followed by a "conditional" jump or branch instruction ("JCC-Y1"). The branch is conditional in that the next instruction to be performed may be either the next sequential instruction ("XXX2") or an instruction at a new address ("Y1"). The processor does not know which branch, or "path," will be taken until JCC-Y1 is executed, i.e., reaches the branch execution unit 150.

Assume now that the branch prediction unit 100 and the next IP logic unit 110 have selected instruction XXX1 to be executed. The processor could wait for XXX1 to move through each stage in the pipeline before processing the next instruction, or JCC-Y1. In this case, the branch execution unit 150 would remain idle while JCC-Y1 moves through the pipeline. To improve the processor's performance, JCC-Y1 is placed into the first stage as soon XXX1 moves into the second stage. As a result, JCC-Y1 will be ready for execution as soon as the branch execution unit 150 is finished with XXX1.

When JCC-Y1 moves into the second stage, however, the processor will not know if XXX2 or YYY1 should be placed into the first stage, because this information is only available after JCC-Y1 has been executed by the branch execution unit 150. Therefore, the branch prediction unit 100 "predicts" which branch of the program will be needed. By way of example, Table I shows the movement of the above instruction sequence through the pipeline shown in FIG. 1. As can be seen at time 6, the branch prediction unit 100 has predicted that instruction YYY1 will follow JCC-Y1. Note that several instruction "clock" cycles may or may not pass the time JCC-Y1 moves into the second stage and the time YYY1 is placed into the first stage.

TABLE I

| | Program Flow | | | | | |
|---|---|---|---|---|---|---|
| Time | First Stage | Second Stage | Third Stage | Fourth Stage | Int. Stages | Execution Stage |
| 1 | XXX1 | | | | ... | |
| 2 | JCC-Y1 | XXX1 | | | ... | |
| 3 | | JCC-Y1 | XXX1 | | ... | |
| 4 | | | JCC-Y1 | XXX1 | ... | |
| 5 | | | | JCC-Y1 | ... | |
| 6 | YYY1 | | | | ... | |
| 7 | YYY2 | YYY1 | | | ... | |
| ... | ... | ... | ... | ... | ... | ... |
| 10 | YYY5 | YYY4 | YYY3 | YYY2 | ... | XXX1 |
| 11 | YYY6 | YYY5 | YYY4 | YYY3 | ... | JCC-Y1 |
| 12 | XXX2 | | | | ... | |
| 13 | XXX3 | XXX2 | | | ... | |
| 14 | XXX4 | XXX3 | XXX2 | | ... | |
| 15 | XXX5 | XXX4 | XXX3 | XXX2 | ... | |

When JCC-Y1 is actually executed at time 11, the branch prediction unit 100 has "mispredicted" and, in fact, XXX2 must be processed next. In this case, instructions YYY1 through YYY6, currently in the pipeline, are discarded and the branch execution unit 150 waits for XXX2 to travel through each pipeline stage before it can be executed. This delay, or mispredicted branch "recovery" time, slows the operation of the processor. Moreover, as the number of stages in a pipeline increases, the delay caused by each mispredicted path may also increase.

DETAILED DESCRIPTION

Figure 1:
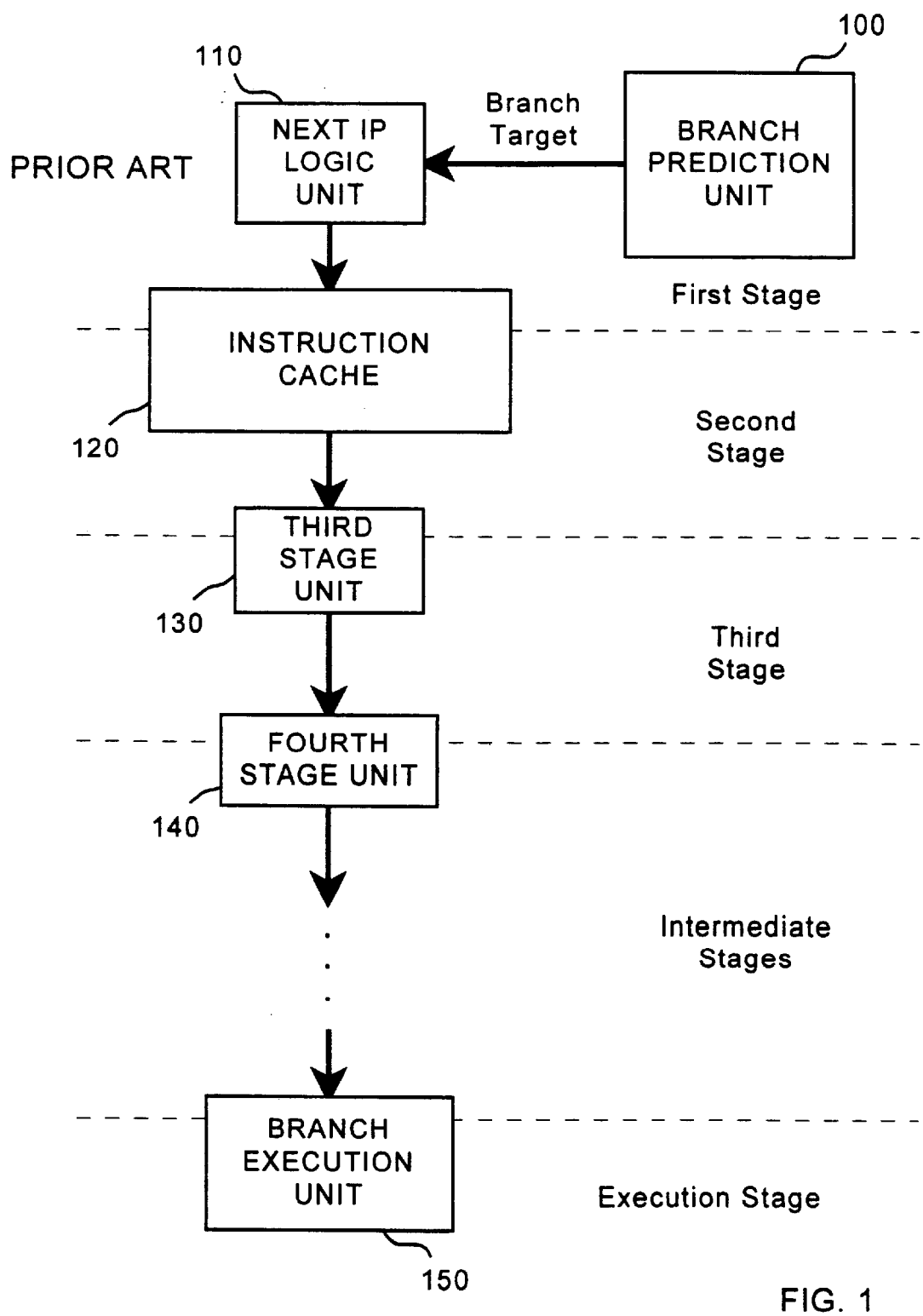
FIG. 1 illustrates a known architecture for an instruction pipeline.

An embodiment of the present invention is directed to a mispredicted path side memory for an instruction pipeline in a processor. Referring now in detail to the drawings wherein like parts are designated by like reference numerals throughout, FIG. 2 is an instruction pipeline according to an embodiment of the present invention.

The first stage of the pipeline includes a branch prediction unit 200 and a next IP logic unit 210 that select an instruction to be executed. The next IP logic unit 210 is coupled to an instruction cache 220 through a multiplexing unit 215. The next IP logic unit 210 is also coupled to a mispredicted path side memory 260 through a mispredicted path data line for the second stage ("MP Data (S2)"). The result of the selection performed by the branch prediction unit 200 and the next IP logic unit 210 is passed to the instruction cache 220 through the multiplexing unit 215. According to an embodiment of the present invention, the result is also stored in the mispredicted path side memory 260.

The instruction cache 220 is accessed in the second stage of the pipeline, and the result moves into a third stage unit 230 through another multiplexing unit 225. This result may also be stored in the mispredicted path side memory 260 through a mispredicted path data line for the third stage ("MP Data (S3)"). The instruction moves from the third stage unit 230 to a fourth stage unit 240 through still another multiplexing unit 235, and the result may again be stored in the mispredicted path side memory 260, and the instruction eventually reaches a branch execution unit 250 in the execution stage. As with FIG. 1, the "intermediate stages" shown in FIG. 2 imply that any number of stages may exist in a pipeline.

Figure 2:
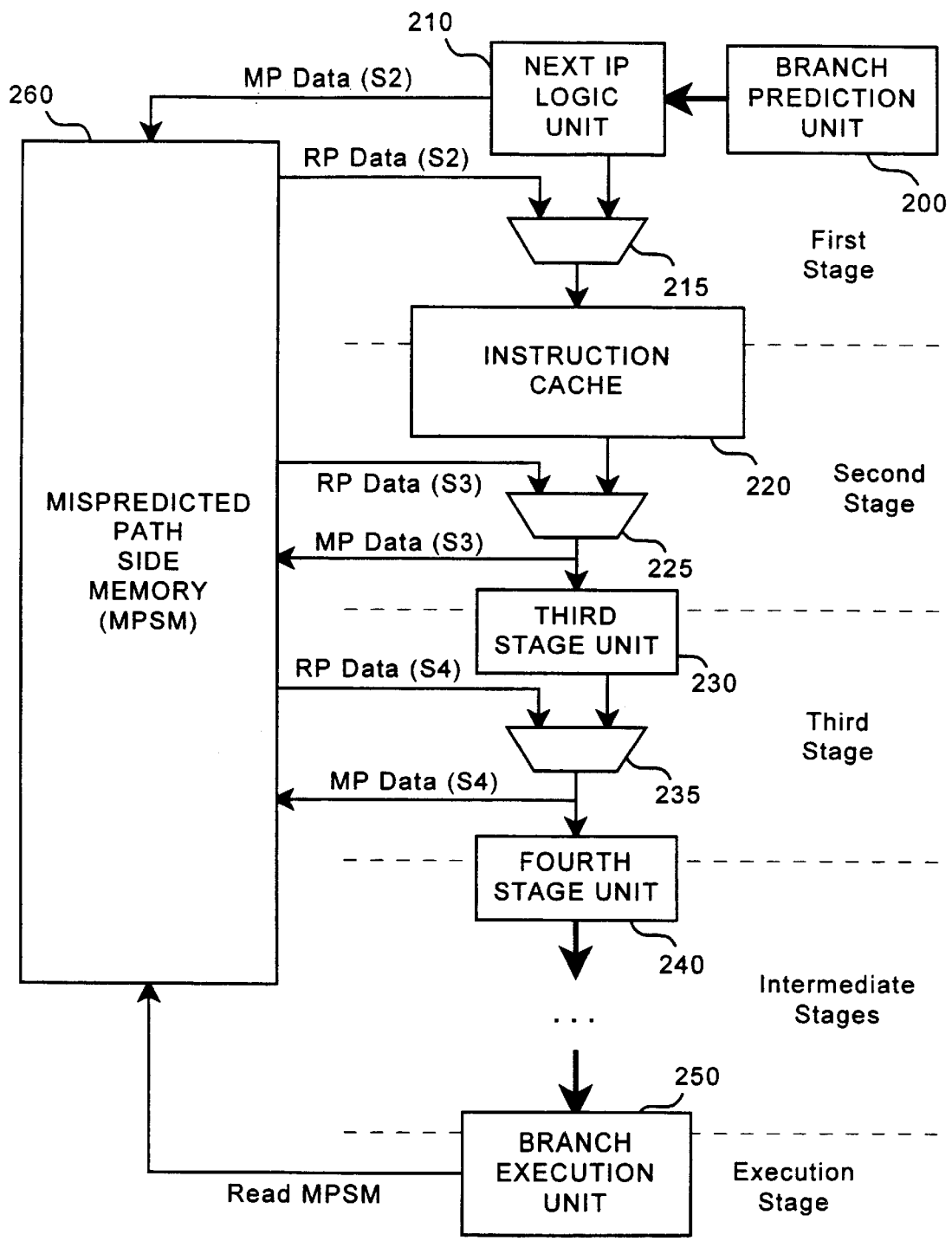
FIG. 2 is an instruction pipeline according to an embodiment of the present invention.

Note that although FIG. 2 shows, for example, that a result is stored in the mispredicted path side memory 260 using the output of the third stage multiplexing unit 235, the result may instead be sent directly from the third stage unit 230 to the mispredicted path side memory 260. Such an approach, or any other approach, can similarly be used in other pipeline stages.

Also note that as an instruction moves from stage to stage in the pipeline, the information that exists in each stage can be different. That is, for example, the third stage unit 230 may receive information and generate a "result," corresponding to that information, that moves into the fourth stage.

Table II shows the movement of the previously described instruction sequence through the instruction pipeline of FIG. 2. At time 6, the branch prediction unit 200 has predicted that instruction YYY1 will follow JCC-Y1. As before, several instruction "clock" cycles may pass between the time JCC-Y1 moves into the second stage (time 3) and the time YYY1 is placed into the first stage (time 6).

TABLE II

Program Flow with Mispredicted Path Side Memory

| Time | First Stage | Second Stage | Third Stage | Fourth Stage | Int. Stages | Execution Stage |
|---|---|---|---|---|---|---|
| 1 | XXX1 | | | | ... | |
| 2 | JCC-Y1 | XXX1 | | | ... | |
| 3 | XXX2 | JCC-Y1 | XXX1 | | ... | |
| 4 | XXX3 | XXX2 | JCC-Y1 | XXX1 | ... | |
| 5 | XXX4 | XXX3 | XXX2 | JCC Y 1 | ... | |
| 6 | YYY1 | (store XXX4) | (store XXX3) | (store XXX2) | ... | |
| 7 | YYY2 | YYY1 | | | ... | |
| ... | ... | ... | ... | ... | ... | ... |
| 10 | YYY5 | YYY4 | YYY3 | YYY2 | ... | XXX1 |
| 11 | YYY6 | YYY5 | YYY4 | YYY3 | ... | JCC-Y1 |
| 12 | XXX5 | (restore XXX4) | (restore XXX3) | (restore XXX2) | ... | |
| 13 | | XXX5 | XXX4 | XXX3 | ... | |
| 14 | | | XXX5 | XXX3 | ... | |
| 15 | | | | XXX5 | ... | |

According to an embodiment of the present invention, instructions from the non-predicted branch may be placed into the pipeline during this time. That is, even though the processor has predicted that YYY1 will follow JCC-Y1, the XXX2 instruction is nevertheless placed into the first stage at time 3. Similarly, when XXX2 moves into the second stage, XXX3 is placed into the first stage. According to one embodiment of the present invention, the results from the first, second and third stages are stored into the mispredicted path side memory 260 as they are generated. According to another embodiment of the present invention, at time 6 the results for XXX2 at the fourth stage, XXX3 at the third stage and XXX4 at the second stage are stored into the mispredicted path side memory 260 all at once.

Tables I and II illustrate that instructions from the non-predicted path may be placed into the pipeline during the time that the stages would otherwise be idle. According to another embodiment of the present invention, YYY1 is actually delayed so that instructions from the non-predicted branch can be executed. That is, the processor "steals" cycles from the predicted, or "main," path because early pipeline stages may have excess bandwidth as compared to the processor's execution capabilities. In such a case, stealing cycles may not greatly reduce performance.

Note that instructions XXX2, XXX3 and XXX4 are executed even though the branch prediction unit 200 has predicted that these instructions will not be needed, and the results of processing these instructions remain stored in the mispredicted path side memory 260 until the associated branch ("JCC-Y1") is executed.

Referring again to Table II, when JCC-Y1 is actually executed at time 11, the branch prediction unit 200 has "mispredicted" and, in fact, XXX2 must be processed next. As a result, instructions YYY1 through YYY6, currently in the pipeline, are discarded.

In this case, however, XXX2 does not need to travel through each pipeline stage before it can be executed. Instead, at time 12 the branch execution unit 250, acting as a mispredicted path side memory control unit, determines that the branch has been mispredicted and sends a signal to the mispredicted path side memory 260 through a read mispredicted path side memory ("read MPSM") control line. This causes the results for XXX2 at the fourth stage, XXX3 at the third stage and XXX4 at the second stage to be restored from the mispredicted path side memory 260 back into the appropriate pipeline stages. This may be done through restored data ("RP Data") lines between the mispredicted path side memory 260 and the multiplexing units 215, 225, 235. Note that some other device may act as the mispredicted path side memory control unit in place of the branch execution unit 250.

In this way, XXX2 only needs to travel from the fourth (not the first) stage to the branch 170 execution unit 250, saving three instruction clock cycles and improving the processor's performance. Moreover, additional pipeline stages may be added to the processor without increasing the delay caused by a mispredicted path.

The reduced latency achieved in the event of a mispredicted branch may more than offset any reduction in performance caused by cycles that are stolen from the predicted path as described above. There may be, according to one embodiment of the present invention, an optimal number of stages that should be stored in the mispredicted path side memory 260. That is, storing too many stages into the mispredicted path side memory 260 may the delay the execution of correctly predicted paths and decrease the processor's overall performance. The optimal number of stages may depend on, for example, how well the pre-fetch bandwidth is utilized, i.e., whether or not there is free bandwidth to steal. The optimal number of stages may also depend on whether or not the stored recovery information can be quickly used. In other words, how soon after a misprediction can the branch execution unit 250 accept a new stream?

According to one embodiment of the present invention, the mispredicted path side memory 260 is organized as a First-In, First-Out (FIFO) memory. In this case, the misprediction information only exists when the associated branch is in the pipeline. Such an arrangement has the advantage of being relatively simple, but a mispredicted path may need to be re-executed each time it is encountered. According to another embodiment of the present invention, the mispredicted path side memory 260 is organized as a small cache. This is more complex than a FIFO arrangement, but may prevent multiple executions of a mispredicted path.

The mispredicted path side memory 260 stores information that may also exist in a main cache or a main memory (not shown in FIG. 2). As a result, provisions may be needed to maintain coherence between these devices according to one embodiment of the present invention.

Figure 3:
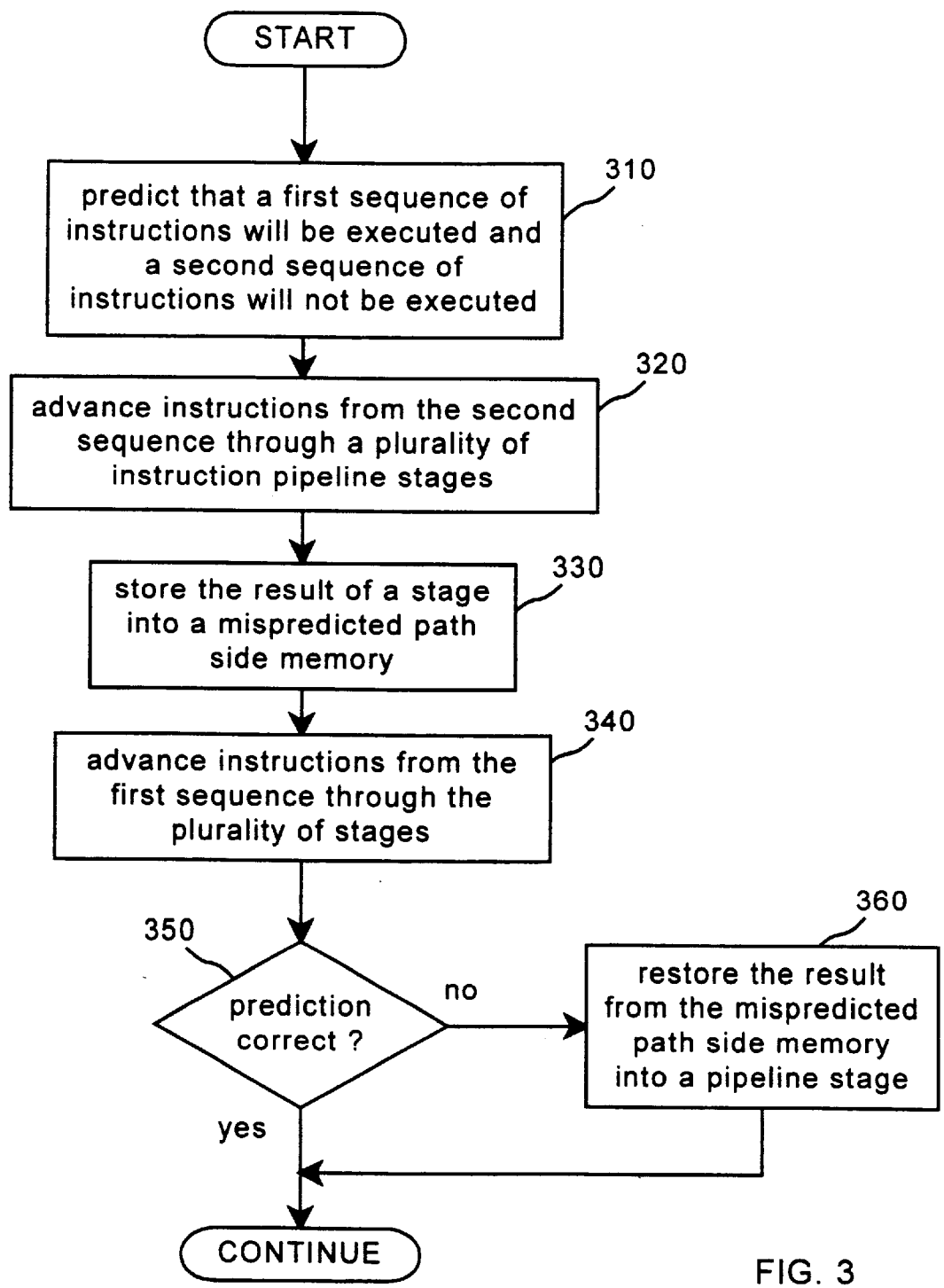
FIG. 3 is a flow diagram of a branch misprediction recovery method according to an embodiment of the present invention.

FIG. 3 is a flow diagram of a branch misprediction recovery method according to an embodiment of the present invention. At 310, the processor predicts that a first sequence of instructions, or branch, will be executed and that a second sequence of instructions will not be executed. Instructions from the second sequence are advanced through a plurality of instruction pipeline stages at step 320.

A result of the second sequence is stored from a stage in the pipeline at step 330, such as by being stored into a mispredicted path side memory, and instructions from the first sequence are advanced through the plurality of stages at step 340.

If the prediction is correct at step 350, instructions proceed through the pipeline as predicted, and the information stored in the mispredicted path side memory is not needed. When the prediction is incorrect at step 350, however, the result is restored into a pipeline stage at step 360 to reduce the time needed to recover from the mispredicted path.

Although various embodiments are specifically illustrated and described herein, it will be appreciated that modifications and variations of the present invention are covered by the above teachings and within the purview of the appended claims without departing from the spirit and intended scope of the invention. For example, although a specific mispredicted path side memory and associated control lines were used to illustrate embodiments of the present invention, it will be appreciated that other implementations will also fall within the scope of the invention. Moreover, the present invention applies to a broad range of pipeline architectures, and is therefore a general approach that includes a broad range of specific implementations. In addition, although software or hardware are described to control certain functions, such functions can be performed using either software, hardware or a combination of software and hardware, as is well known in the art. As is also known, software may be stored, such as in memory, in the form of instructions, including micro-code instructions, adapted to be executed by a processor. As used herein, the phrase "adapted to be executed by a processor" encompasses instructions that need to be translated before being executed by the processor.

What is claimed is:

1. A method for branch misprediction recovery in a multi-stage pipelined processor, the method comprising:
   predicting at a branch, an instruction sequence predicted to be executed and an instruction sequence predicted not to be executed;
   advancing an instruction in the instruction sequence that is predicted not to be executed through a plurality of instruction pipeline stages for execution;
   storing to a mispredicted path side memory, each stage in parallel, a result of the instruction in the instruction sequence that is predicted not to be executed from the plurality of instruction pipeline stages;
   advancing an instruction in the instruction sequence predicted to be executed through the plurality of instruction pipeline stages for execution after the instruction in the instruction sequence that is predicted not to be executed is advanced;
   determining if the instruction in the instruction sequence predicted to be executed was predicted correctly; and
   if the instruction in the instruction sequence predicted to be executed was mispredicted, restoring in parallel the result from the storing operation into the plurality of instruction pipeline stages for continued execution.

2. The method of claim 1, the method further comprises:
   if the instruction in the instruction sequence predicted to be executed was predicted correctly, discarding the stored result of the instruction that is predicted not to be executed.

3. The method of claim 1, the method further comprises:
   predicting that another instruction will be executed;
   advancing the another instruction through the plurality of stages;
   determining if the another instruction was predicted correctly; and
   if the another instruction was not predicted correctly, restoring in parallel the result from the storing operation into the plurality of instruction pipeline stages for continued execution.

4. The method of claim 1, wherein the restoring operation comprises restoring the result from the mispredicted branch side memory.

5. The method of claim 1, wherein the mispredicted branch side memory comprises a First-In, First-Out memory.

6. The method of claim 1, wherein the mispredicted branch side memory comprises a cache memory.

7. The method of claim 1, wherein the storing operation and restoring operation are performed with respect to the same pipeline stage.

8. The method of claim 1, wherein a plurality of instruction pipeline stages are a defined optimal number of stages.

9. A machine-readable medium having stored thereon a plurality of executable instructions to be executed by a processor to implement a method for branch misprediction recovery, the method comprising:
   predicting at a branch, an instruction sequence predicted to be executed and an instruction sequence predicted not to be executed;
   advancing an instruction in the instruction sequence that is predicted not to be executed through a plurality of instruction pipeline stages for execution;
   storing to a mispredicted path side memory, each stage in parallel, a result of the instruction in the instruction sequence that is predicted not to be executed from the plurality of instruction pipeline stages;
   advancing an instruction in the instruction sequence predicted to be executed through the plurality of instruction pipeline stages for execution after the instruction in the instruction sequence that is predicted not to be executed is advanced;
   determining if the instruction in the instruction sequence predicted to be executed was predicted correctly; and
   if the instruction in the instruction sequence predicted to be executed was mispredicted, restoring in parallel the result from the storing operation into the plurality of instruction pipeline stages for continued execution.

10. The machine-readable medium of claim 9, the method further comprises:

if the instruction in the instruction sequence predicted to be executed was predicted correctly, discarding the stored result of the instruction that is predicted not to be executed.

11. The machine-readable medium of claim 9, the method further comprises:

predicting that another instruction will be executed;

advancing the another instruction through the plurality of stages;

determining if the another instruction was predicted correctly; and if the another instruction was not predicted correctly, restoring in parallel the result from the storing operation into the plurality of instruction pipeline stages for continued execution.

12. The machine-readable medium of claim 9, wherein the restoring operation comprises restoring the result from the mispredicted branch side memory.

13. The machine-readable medium of claim 9, wherein the storing operation and restoring operation are performed with respect to the same pipeline stage.

14. The machine-readable medium of claim 9, wherein a plurality of instruction pipeline stages are a defined optimal number of stages.

15. Apparatus for branch misprediction recovery, comprising:

a branch prediction unit to predict, at a branch, that an instruction sequence will be executed and an instruction sequence will not to be executed;

a plurality of instruction pipeline stages to advance an instruction in the instruction sequence that is predicted not to be executed and to advance an instruction in the instruction sequence predicted to be executed through the plurality of instruction pipeline stages for execution after the instruction in the instruction sequence that is predicted not to be executed is advanced;

a mispredicted path side memory, coupled to the plurality of instruction pipeline stages, to store in parallel a result of the instruction in the instruction sequence that is predicted not to be executed from the plurality of instruction pipeline stages;

a branch execution unit to determine if the instruction in the instruction sequence predicted to be executed was predicted correctly and if the instruction in the instruction sequence predicted to be executed was mispredicted, the branch execution unit restoring in parallel the result from the storing operation into the plurality of instruction pipeline stages for continued execution.

16. The apparatus of claim 15, wherein the branch execution unit comprises:

a non-predicted memory control unit to transmit a read mispredicted path side memory signal to the non predicted path side memory and in response, the non-predicted path side memory is to restore the result into the plurality of instruction pipeline stages in parallel.

17. The apparatus of claim 15, further comprises:

a non-predicted data line that is to couple each stage of the plurality of instruction pipeline stages to the mispredicted path side memory and to transfer a result from that stage to the mispredicted path side memory.

18. The apparatus of claim 17, further comprises:

a recovery path data line that is to couple each stage of the plurality of instruction pipeline stages to the mispredicted path side memory and to restore a result from the mispredicted path side memory to that stage.

19. The apparatus of claim 18, further comprises:

a multiplexer that is coupled at a first input to a stage of the plurality of pipeline stages via an input data line and is coupled at a second input to the mispredicted path side memory via the recovery path data line.

20. The apparatus of claim 19, wherein the multiplexer is coupled at an output to a next stage via an output data line and is coupled at the output to the mispredicted path side memory via the mispredicted data line.

21. The apparatus of claim 15, wherein the mispredicted path side memory comprises a First-In, First-Out memory structure.

22. The apparatus of claim 15, wherein the mispredicted path side memory comprises a cache memory.

23. The apparatus of claim 15, wherein a plurality of instruction pipeline stages are a defined optimal number of stages.

* * * * *